United States Patent
Karlsson et al.

(10) Patent No.: US 7,835,937 B1
(45) Date of Patent: Nov. 16, 2010

(54) METHODS FOR CONTROLLING AN ADVERTISING CAMPAIGN

(75) Inventors: Niklas Karlsson, Mountain View, CA (US); Jianlong Zhang, Mountain View, CA (US); Yonggang Xu, Mountain View, CA (US)

(73) Assignee: AOL Advertising Inc., Baltimore, MD (US)

(*) Notice: Subject to any disclaimer, the term of this patent is extended or adjusted under 35 U.S.C. 154(b) by 423 days.

(21) Appl. No.: 11/907,587

(22) Filed: Oct. 15, 2007

(51) Int. Cl.
*G06F 17/00* (2006.01)
(52) U.S. Cl. ...................................................... 705/10
(58) Field of Classification Search .................... 705/10
See application file for complete search history.

(56) References Cited

U.S. PATENT DOCUMENTS

| | | | | |
|---|---|---|---|---|
| 5,227,874 A * | 7/1993 | Von Kohorn | | 705/10 |
| 5,446,919 A * | 8/1995 | Wilkins | | 725/35 |
| 6,006,197 A | 12/1999 | d'Eon et al. | | |
| 7,039,599 B2 | 5/2006 | Merriman et al. | | |
| 7,212,974 B2 * | 5/2007 | Kilbank | | 704/501 |
| 2003/0033405 A1 * | 2/2003 | Perdon et al. | | 709/224 |
| 2003/0225738 A1 | 12/2003 | Ternoey et al. | | |
| 2005/0086605 A1 * | 4/2005 | Ferrer et al. | | 715/745 |
| 2005/0096950 A1 | 5/2005 | Caplan et al. | | |
| 2006/0085419 A1 * | 4/2006 | Rosen | | 707/9 |
| 2006/0122879 A1 | 6/2006 | O'Kelley | | |
| 2006/0224447 A1 * | 10/2006 | Koningstein | | 705/14 |
| 2007/0027754 A1 * | 2/2007 | Collins et al. | | 705/14 |
| 2007/0118425 A1 * | 5/2007 | Yruski et al. | | 705/14 |
| 2007/0244760 A1 * | 10/2007 | Bodnar et al. | | 705/14 |
| 2007/0261072 A1 * | 11/2007 | Boulet et al. | | 725/14 |
| 2008/0052140 A1 * | 2/2008 | Neal et al. | | 705/7 |
| 2009/0157442 A1 * | 6/2009 | Tesler | | 705/7 |

OTHER PUBLICATIONS

Copending U.S. Appl. No. 11/979,096, filed Oct. 31, 2007, in the name of Niklas Karlsson, entitled "Pre-Shape Filter."
Copending U.S. Appl. No. 11/979,098, filed Oct. 31, 2007, in the name of Niklas Karlsson, entitled "Advertising Revenue Predictor."
Colombo, Richard, "A Model for Diagnosing and Reducing Nonresponse Bias," Journal of Advertising Research, Jan.-Apr. 2000, p. 85 (12 pages).

* cited by examiner

*Primary Examiner*—Thomas Dixon
(74) *Attorney, Agent, or Firm*—Finnegan, Henderson, Farabow, Garrett & Dunner, LLP (57) ABSTRACT

Methods and systems consistent with the present invention enable the control of aspects of an advertising campaign, such as revenue expenditure, by comparing actual and desired behavior and incorporating feedback and feed-forward error correction to continuously adjust the campaign's behavior. In certain embodiments, this control is achieved without considering individual advertisement requests or ad placements, thus bypassing the lowest-level details and instead adjusting behavior on a campaign-wide level using an adaptive control system.

24 Claims, 5 Drawing Sheets

METHODS FOR CONTROLLING AN ADVERTISING CAMPAIGN

FIELD OF THE INVENTION

This invention is generally related to advertising. This invention is more specifically related to delivering an advertisement budget according to a desired spending plan.

BACKGROUND OF THE INVENTION

Since the early 1990's, the number of people using the World Wide Web has grown at a substantial rate. As more users take advantage of the World Wide Web, they generate higher and higher volumes of traffic over the Internet. As the benefits of commercializing the Internet can be tremendous, businesses increasingly take advantage of this traffic by advertising their products or services on-line. These advertisements may appear in the form of leased advertising space (e.g., "banners") on websites or advertisements on digital television, which are comparable to rented billboard space in highways and cities or commercials broadcasted during television or radio programs.

Advertisers may create advertising campaigns that include many advertisements to be placed on websites during a specified period of time. For example, an automobile company may design several advertisements for a new model and may wish to have the advertisements placed during a three-week period around the launch of the new model. Each time one of the advertisements is shown to a user is known as an "impression." When shown the advertisement, the user may select, or "click," on the advertisement or may take another "action" such as completing an online form to request more information. If the user later purchases the new model automobile, the purchase is referred to as a "conversion" of the impression.

Advertisers may be interested in impressions (e.g., if they are trying to increase awareness of a brand), clicks (e.g., if they are trying to provide more information about a product), or conversions (e.g., if they are trying to make sales or get new users to sign up for services). Advertisers may pay based on, for example, impressions, clicks, or conversions over the course of an advertising campaign. An advertiser may have a spending plan that specifies how the advertiser wishes to spend its budget during a campaign. For example, the advertiser may wish to spend money only on certain days during the campaign, or may wish to spend evenly over every day of the campaign.

It is accordingly an object of the invention to provide methods and systems to control the expenditure of an advertiser's budget over the course of an advertising campaign, for example, by smoothing revenue or impression volume.

SUMMARY OF THE INVENTION

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

Consistent with an embodiment of the present invention, a method for controlling an advertising campaign is provided. In this method, a signal representing a desired behavior of the advertising campaign is received and data about the advertising campaign is monitored, including a volume of impressions and a revenue generated during part of the advertising campaign. An actual behavior of the advertising campaign is evaluated, based on the monitored data, relative to the desired behavior to determine a feedback signal and a control signal is generated according to the feedback signal and at least one aspect of the campaign. Finally, the control signal is output to adjust the actual behavior of the advertising campaign.

In other embodiments, a signal representing a desired behavior of the advertising campaign is received. An estimated parameter representing an aspect of the advertising campaign is also received. The signal representing the desired behavior is filtered according to the estimated parameter, and an actual behavior of the advertising campaign is monitored. A predicted revenue of the advertising campaign is computed based on the estimated parameter and the actual behavior of the advertising campaign. The filtered signal representing the desired behavior and the predicted revenue are compared to identify a tracking error in the advertising campaign, and a feedback signal is computed to correct the tracking error. A control signal is generated based on the feedback signal to control the actual behavior of the advertising campaign relative to the desired behavior of the advertising campaign.

In still other embodiments, a system is provided for controlling an advertising campaign based on a signal representing a desired behavior of the advertising campaign and an estimated parameter representing an aspect of the advertising campaign. The system comprises a pre-shape filter that filters the signal representing the desired behavior according to the estimated parameter and a revenue predictor that receives monitoring data related to an actual behavior of the advertising campaign and computes a predicted revenue of the advertising campaign based on the data related to the actual behavior of the advertising campaign and the estimated parameter. The system also comprises a feedback controller that compares the filtered signal representing the desired behavior and the predicted revenue, identifies a tracking error in the advertising campaign, and computes a feedback signal to correct the tracking error and a feed-forward controller that determines a feed-forward signal representing a preemptive control action based on the desired behavior and the estimated parameter. The system further comprises an integration component that integrates the feedback signal and the feed-forward signal to generate a control signal to adjust the actual behavior of the advertising campaign relative to the desired behavior of the advertising campaign.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. In the drawings.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

At the start of an advertising campaign, an advertiser may specify a number of requirements for a campaign in an insertion order (IO). The requirements of the IO may define, for example, the duration of the campaign, the total budget, the event or events (impression, click, or conversion) used to measure performance, constraints on the delivery of the ad, the cost of each event, etc. In certain embodiments, the IO may also include a spending plan that specifies a budget delivery rate, i.e., the rate at which the budget is spent throughout the duration of the campaign, enforcing a revenue smoothness control. A scheduling program can be used to manage the campaign so that the rate at which the advertiser's budget is spent matches the terms of the IO. The campaign may also be managed so that profit is maximized for a manager of the advertising campaign. In simple terms, the advertiser's budget expenditure is the manager's revenue so the scheduling program can be used to maximize results for all parties involved.

The advertiser's spending plan may specify how the advertiser wants its budget to be spent over the course of an advertising campaign. For example, an advertiser may be interested in obtaining a uniform budget delivery rate for advertisements throughout the duration of the campaign. In this situation, the advertiser could establish a requirement that the amount of money spent to place ads be the same every day during the campaign. In this way the budget delivery is "smoothed," or spread out over the duration of the campaign, rather than being spent all at one time.

Online advertisements are placed using inventory segments. An inventory segment is a part of the available advertising space or time that the manager controls. For example, an inventory segment may include a geographic region, or users of a particular internet search engine. Some inventory segments are in greater demand than others, therefore these segments may cost more than others for an advertiser. Advertisers may bid for advertising slots on selected websites based on targeting a desired audience. Advertisers may also set other parameters, such as a maximum number of impressions. By adjusting these parameters, a revenue smoothness controller can affect how the ad is placed and, therefore, how the advertiser's budget is spent.

To smooth the budget expenditure during an advertising campaign, a plant model may be used to represent the system of online advertisements and web-surfers that together generate the revenue for advertising campaigns. In certain embodiments, the input to the plant is one or more control signals, which may be for example a factor to scale the price of an event (i.e., an enhancement factor) or an adjustment to the bid price of the campaign. In these embodiments, the output of the plant contains volume and revenue data. Several models are proposed to describe the relationship between plant input and plant output and its internal dynamics. These models are used for control design analysis and simulation validation in online advertising systems.

Control signals may be used to adjust the actual behavior of a campaign so that it more closely matches a desired behavior of the advertising campaign, such as a requirement of the IO. Control signals may accelerate or decelerate the placement of the advertisements for a given campaign in order to control the revenue spent during the campaign. Since different campaigns may have a very different behavior, the control parameters associated with the proposed models may change significantly from one campaign to another. Furthermore, for a given campaign, its associated control parameters may also vary with time.

Systems consistent with the present invention can adjust the marginal or cumulative revenue, or a filtered version of the revenue, e.g. a running average of the last 24 hours of revenue data, so that it follows a desired delivery rate by actively adjusting the price of ads at the campaign level. The desired delivery rate may be specified, for example, as part of the advertiser's IO. The price adjustment may be applied for example as a multiplier that scales up when additional revenue is required and scales down when revenue needs to be reduced, or as an additive term increasing or decreasing the perceived price of a campaign making it more competitive relative competing campaigns and advertisers.

Two types of revenue smoothness control include keep schedule and defined schedule. Under keep schedule, the desired delivery rate of ads is specified in terms of the cumulative revenue. In a keep schedule situation, if the budget delivery rate is low for a few days or hours, then the delivery rate for the next days or hours will be increased to compensate. Under defined schedule, the desired delivery rate of ads is specified in terms of the marginal revenue, e.g. revenue per hour, or per day. Other types of revenue smoothness control exist and include, for example, a combination of keep and defined schedule control. In certain cases, the control is dictated by the budget and the duration of the contract; the budget is spent uniformly each day for the duration of the campaign.

Figure 1:
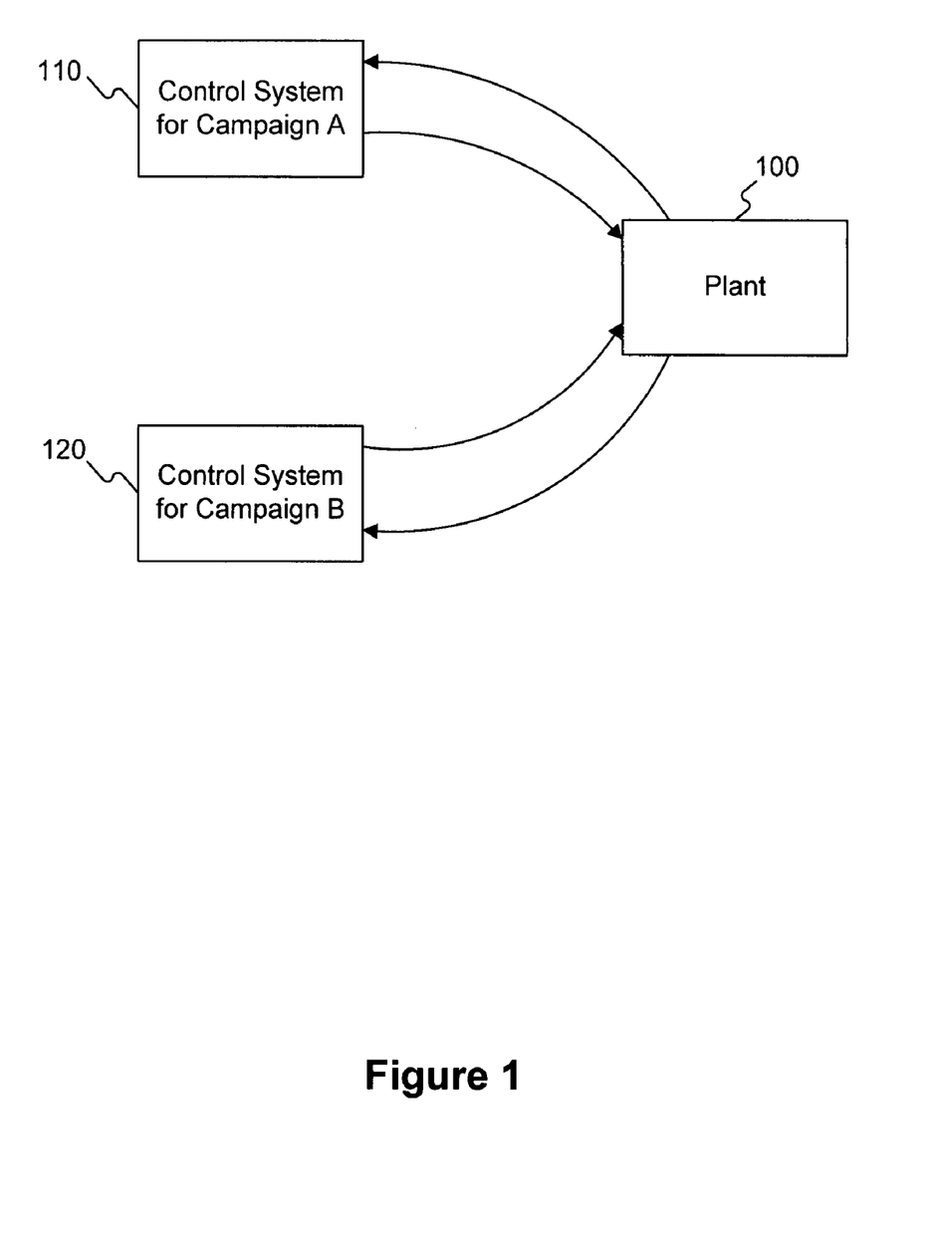
FIG. 1 is a block diagram of a system for feedback control, consistent with an embodiment of the present invention.

FIG. 1 shows an overview of a feedback system for budget control consistent with an embodiment of the present invention. In the feedback system of FIG. 1, a plant 100 represents a system to be controlled and it consists of active advertising campaigns. A control system for campaign A 110 and a control system for campaign B 120, are shown, though one skilled in the art will recognize that any number of campaigns can be managed in the feedback system of FIG. 1. Control systems 110 and 120 regulate campaign activities by sending control signals calculated based on feedback information. The present invention can accommodate a plurality of advertising campaigns at one time. In the embodiment of FIG. 1, the feedback control system is depicted in a decentralized fashion. In other words, for an active campaign, a control system at the campaign level regulates this campaign's activities based on information about those activities. For the sake of clarity, the control system for revenue smoothness will now be discussed at the campaign level.

Figure 2:
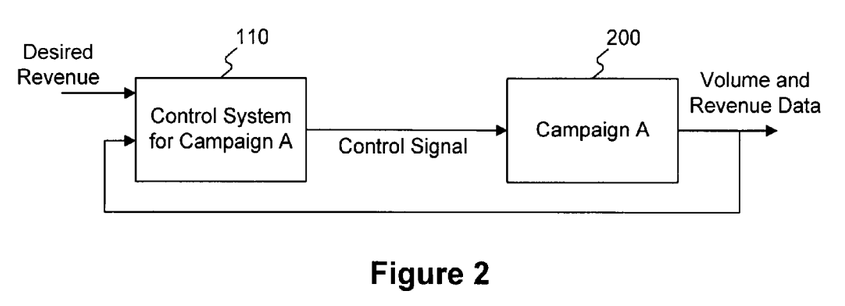
FIG. 2 is a block diagram of a closed-loop system at the campaign level, consistent with an embodiment of the present invention.

FIG. 2 shows an example of part of the feedback system of FIG. 1 corresponding to advertising campaign A. A closed-loop system at the campaign level, as shown in FIG. 2, can be viewed as a connection between one campaign, e.g., campaign A 200 and its corresponding control system 110. The input to this closed-loop system is composed of one or more signals indicating a desired behavior of a campaign A 200. For example, in the case of keep schedule revenue control of the input signal may be a desired cumulative revenue to be generated from a particular campaign. The desired cumulative revenue may be, for example, revenue specified in the IO. The output of the closed-loop system may be, for example, volume and revenue data from campaign A 200. Feedback data is data about the actual behavior of the campaign for some period of time in the past. It may be, for example, the generated revenue of the campaign. With the input signal and feedback data, control system 110 generating a control signal to force campaign A 200 to generate revenue smoothly as specified by the input signal. In this embodiment, it may be helpful to view the revenue control problem as a tracking control problem, because control system 110 is designed to force the campaign revenue to track the input signal assigned for campaign A 200.

Figure 3:
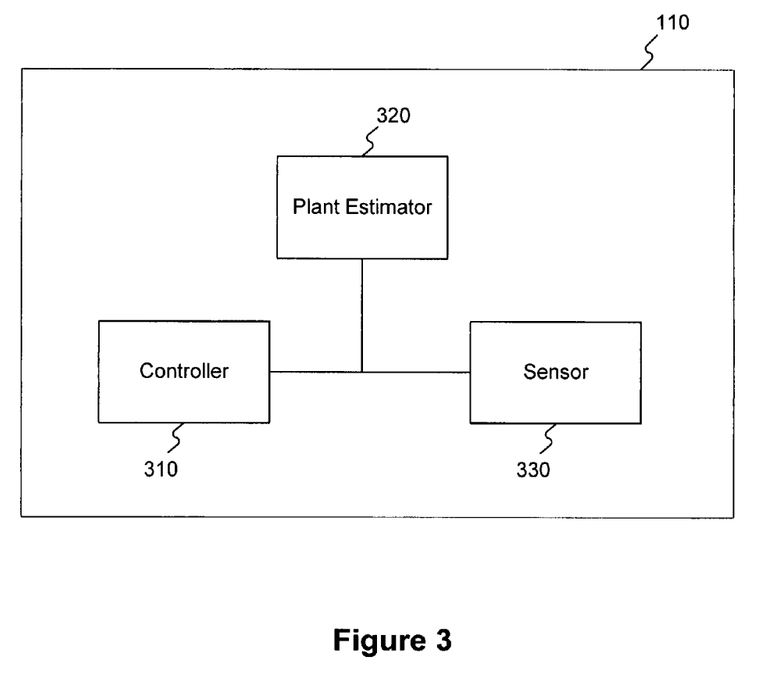
FIG. 3 is a block diagram of the interconnection of three modules in the closed-loop system, consistent with an embodiment of the present invention.

FIG. 3 is a block diagram of a campaign control system in greater detail, consistent with an embodiment of the present invention. As shown in FIG. 3, control system 110 includes a sensor 330, a plant estimator 320 and a controller 310.

Sensor 330 receives data about the advertising campaign in real time and computes measurements for feedback controller 310 and plant estimator 320. Some outputs of sensor 330 are volumes (e.g., impression, click, and action volumes) and revenue data. Plant estimator 320 and controller 310 rely on the quality of data generated by sensor 330. To send reliable measurements to controller 310 and plant estimator 320 as soon as possible, adaptive control system 110 may use an algorithm based on non-parametric latency (the sum of lag and delay) estimation.

Each campaign can be described by a mathematical model defined by a set of plant parameters representing certain aspects of the actual behavior of the advertising campaign. A fixed-gain controller 310 may not be able to consider changes in plant parameters. Such changes can be a result of a change in the number of users viewing the advertisements due to, for example, a change in the time of day or during a holiday period. A fixed-gain controller 310 may be unable to stabilize all the campaigns and deliver the desired performance, according to the control parameters.

An adaptive control system 110, which estimates the plant parameters in real time and tunes its control parameters to counteract the changes in plant parameters, is able to incorporate changes in plant parameters and deliver the desired performance.

Different campaigns possess different plant parameters, and the control parameters for a given campaign may also change with time. To deal with such a situation, plant estimator 320 estimates unknown plant parameters based on the plant input and outputs as reported by sensor 330. Plant estimator 320 provides reliable estimates for unknown parameters to feedback controller 440 so that controller 310 may predict the system behavior and tune its gains adaptively to achieve desired performance.

Controller 310 uses an algorithm to compute a control signal that makes plant 100 behave as prescribed by the reference signal fed into controller 310. To make control possible, control system 110 needs, in addition to the reference signal, a feedback signal (for example, the generated revenue of the campaign in budget control) reported by sensor 330 and the on-line plant parameter estimates provided by plant estimator 320. The feedback signal, together with the reference signal, tells controller 310 what the current tracking error is and in what trend the error moved in history. Controller 310 then robustly tunes the control parameters based on the plant parameter estimates. It generates a smooth control signal to push the tracking error towards zero.

Figure 4:
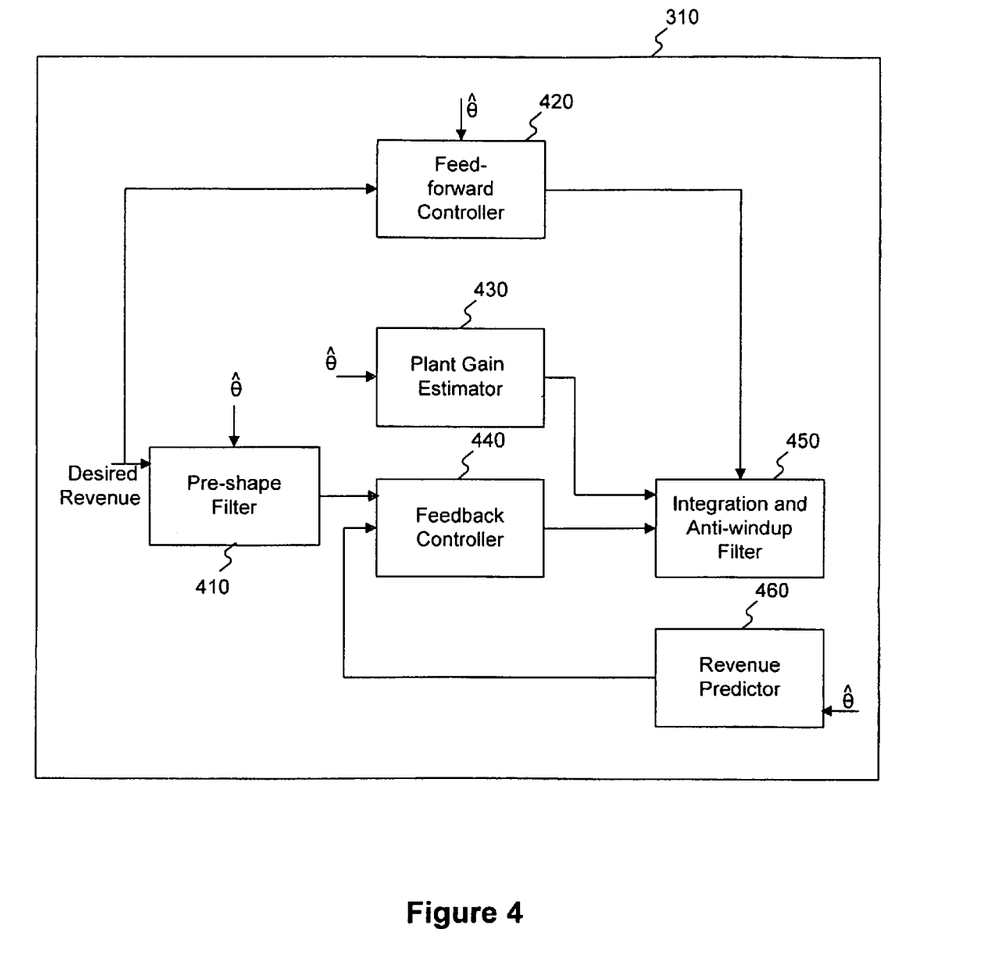
FIG. 4 is a block diagram of a controller, consistent with an embodiment of the present invention.

FIG. 4 is a block diagram showing a controller in greater detail, consistent with embodiments of the present invention. As shown, controller 310 may include a pre-shape filter 410, a feed forward controller 420, a plant gain estimator 430, a feedback controller 440, integration and anti-windup filter 450, and a revenue predictor 460.

As described above, controller 310 may communicate with plant estimator 320 and sensor 330. In certain embodiments, plant estimator 320 provides estimates of plant parameters that distinguish one advertising campaign from another (e.g., click volume parameters, impression volume parameters, and impression-to-conversion probability parameters) to controller 310. Sensor 330 fetches data about the advertising campaign (e.g., volume and revenue data) in real time and estimates measurement delay and lag to determine when the data is reliable enough to provide to controller 310. Controller 310 uses these inputs to compare the actual behavior of an advertising campaign to a desired behavior of the advertising campaign (e.g., the advertiser's spending plan) and determines corrective actions, if needed, to minimize the difference. In this way, controller 310 may help compensate for variations such as uncertain lag or delay, inaccurate plant parameter estimates, and other disturbances in plant 100.

Using pre-shape filter 410, feed-forward controller 420, plant gain estimator 430, feedback controller 440, integration and wind-up filter 450, and revenue predictor 460, controller 310 smoothes behavior of the advertising campaign, e.g., by smoothing the delivery of the advertising campaign's budget to match the advertiser's desired spending plan.

Controller 310 uses revenue predictor 460 to predict revenue of the advertising campaign in order to measure the behavior of the campaign. For example, revenue predictor 460 may use volume data (e.g., impression volume data received from sensor 330) and estimated plant parameters (e.g., an estimated conversion probability received from plant estimator 320) to predict revenue of the advertising campaign.

Pre-shape filter 410 receives a reference signal representing a desired behavior of the advertising campaign (e.g., an advertiser's desired spending plan) and adjusts the reference signal to account for estimated plant parameters of the advertising campaign (e.g., parameters related to periodic or time-related aspects of the advertising campaign received from plant estimator 320).

Feedback controller 440 receives the modified reference signal from pre-shape filter 410, representing the desired behavior of the advertising campaign, in addition to the revenue predicted by revenue predictor 460. Using these inputs, feedback controller 440 determines a tracking error and computes a feedback signal to compensate for differences between the desired and actual behaviors of the advertising campaign. The feedback signal represents corrective action that will reduce the tracking error toward zero, smoothing the behavior of the advertising campaign. In certain embodiments, the feedback signal consists of a normalized, incremental control action to be taken in each period, e.g., each hour. In these embodiments, the feedback signal is determined independent of the estimated plant parameters. Thus, in order to adjust the feedback signal generated by feedback controller 440, aspects of the plant (e.g., an average plant gain for a specific advertising campaign) may be considered.

Accordingly, plant gain estimator 430 uses the most recent estimated plant parameters (e.g., plant parameters received by controller 310 from plant estimator 320) to estimate an average plant gain from control signal to associated revenue. This estimated plant gain may be used to adjust the feedback signal generated by feedback controller 440. In certain embodiments, an advertising campaign modeled by plant 100 is subject to significant time-of-day variances, meaning that a change in the control signal will affect generated revenue differently depending on the time of day when the change is made to the control signal. Thus, plant gain estimator 430 is used by controller 310 to determine an estimated gain of the advertising campaign to allow controller 310 to adjust its control signal accordingly.

As described above, feedback controller 440 determines a tracking error after it has occurred. On the other hand, feed-forward controller 420 computes a preemptive control action to adjust the control signal generated by controller 310 before a tracking error can occur. To do so, feed-forward controller 420 receives the reference signal representing the desired behavior of the advertising campaign (e.g., an advertiser's desired spending plan) and estimated plant parameters of the advertising campaign (e.g., estimated impression volume parameters or click volume parameters of advertising campaign received from plant estimator 320). Feed-forward controller 420 uses these inputs together with a cost-per-unit (CPU) of the campaign to compute a feed-forward control signal. In this way, feed-forward controller 420 determines preemptive control measures to adjust the control signal generated by controller 310 in order to smooth the behavior of the advertising campaign.

As shown in FIG. 4, in certain embodiments of the present invention controller 310 includes both feedback control and feed-forward control. Feedback controller 440 determines corrective control actions based on tracking errors that have already occurred, while feed-forward controller 420 determines preemptive control actions based on, for example, changes in estimated plant parameters.

Integration and anti-windup filter 450 uses the output of feedback controller 440, plant gain estimator 430, and feed-forward controller 420 to generate the final control signal produced by controller 310. In certain embodiments, the normalized incremental control signal generated by feedback controller 440 is adjusted by the estimated plant gain determined by plant gain estimator 430 in order to account for characteristics of the specific advertising campaign modeled by plant 100. The adjusted signal is used, together with the feed-forward control signal output by feed-forward controller 420, to generate the final control signal. This integration of the adjusted feedback signal and the feed-forward signal results in a final control signal. However, if the final control signal is too high it might compromise the profitability of the advertising campaign, while a final control signal that is too low might cause numerical problems for plant estimator 320. To maintain optimal performance of controller 310, an anti-windup sub-module in integration and anti-windup filter 450 may be used to limit the final control signal within a desired interval.

A skilled artisan will appreciate that controller 310, consistent with embodiments of the present invention, may include fewer or more of the components shown in FIG. 4. For example, feed-forward controller may not be used. Components may also be combined or separated. For example, the anti-windup module may be separated from integration module 450, or anti-windup may not be used at all.

Figure 5A:
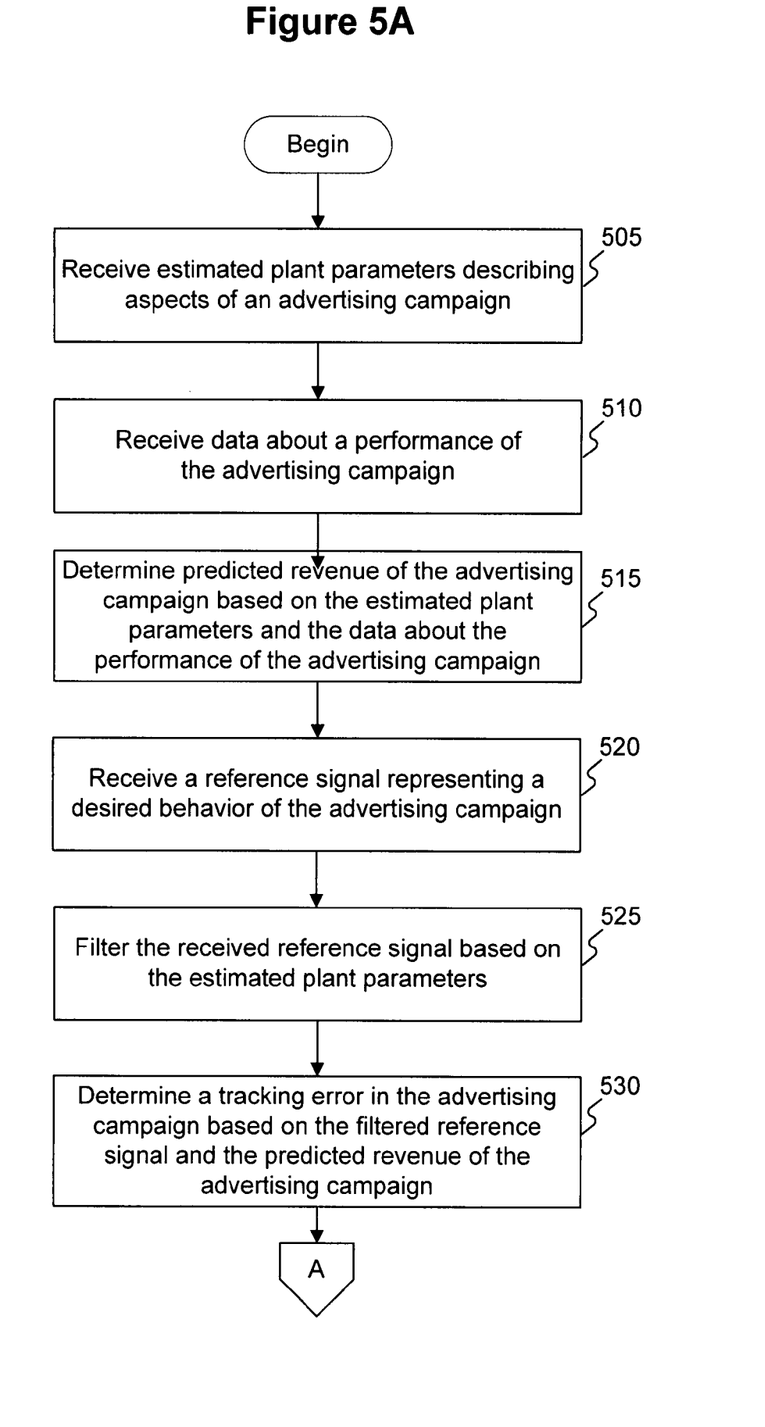
FIGS. 5A-5B show a flowchart of a process for controlling revenue smoothness in an advertising campaign, consistent with embodiments of the present invention.
Figure 5B:
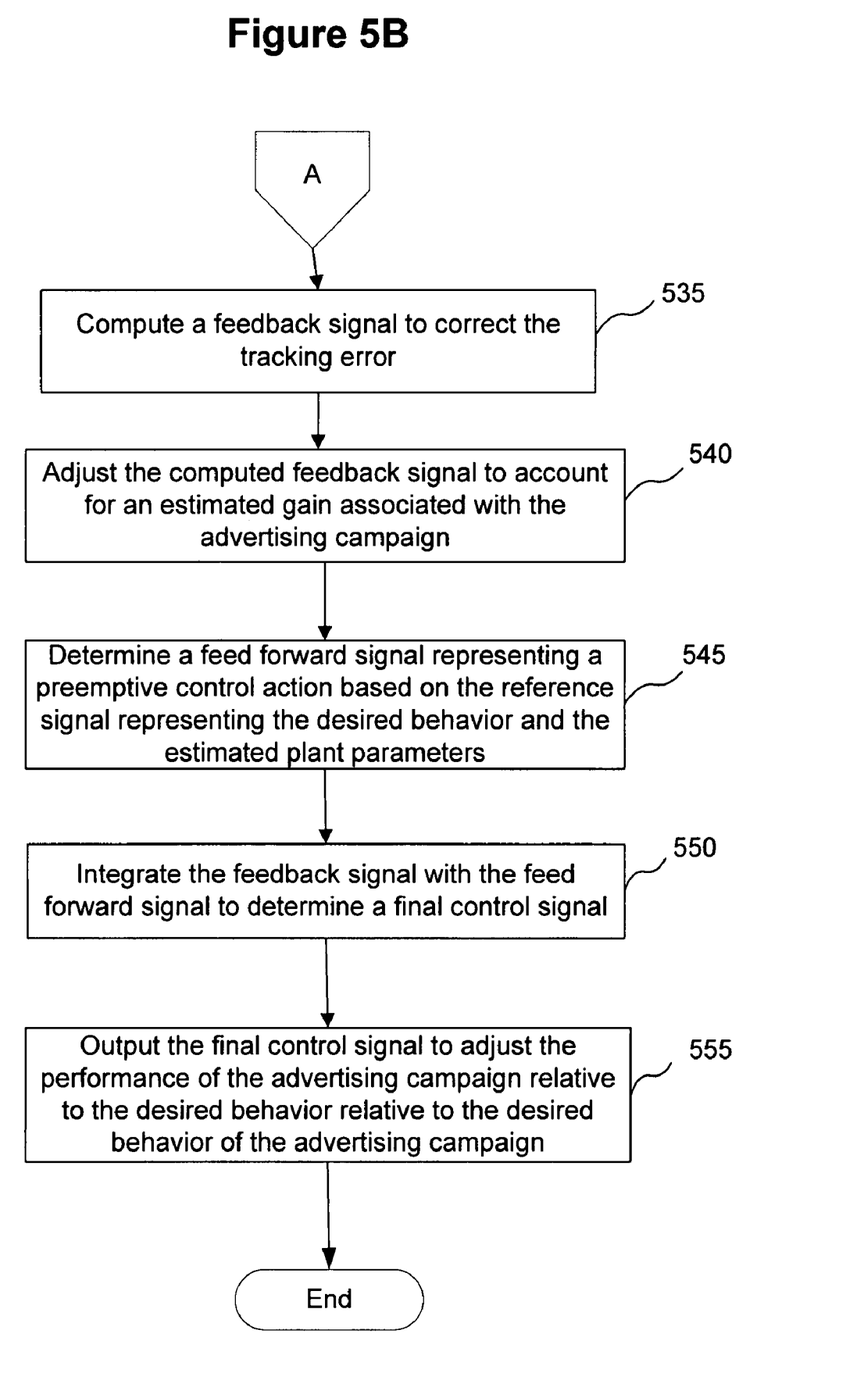

FIGS. 5A-5B show a flowchart of a process for controlling revenue smoothness in an advertising campaign, consistent with embodiments of the present invention. A controller, such as controller 310, receives estimates of plant parameters describing aspects of an advertising campaign (step 505). Plant parameters may be, for example, click volume parameters, impression volume parameters, and/or impression-to-conversion probability parameters estimated by plant estimator 320. The controller also receives data about the performance of the advertising campaign (step 510), such as volume and revenue data collected in real time by sensor 330. Based on the estimated plant parameters and the data about the performance of the advertising campaign, the controller may determine predicted revenue of the advertising campaign (step 515).

The controller also receives a reference signal representing a desired behavior of the advertising campaign (step 520). The desired behavior may be, for example, a spending plan that specifies how a budget for the advertising campaign should be spent over the course of the campaign. The received reference signal may be filtered to account for estimated plant parameters of the advertising campaign (step 525). For example, the filtering may be based on periodic aspects of the campaign's performance over time. The filtered reference signal and the predicted revenue are used to determine a tracking error in the campaign (step 530) and a feedback signal is computed to correct the tracking error (step 535). For example, the feedback signal may be computed to compensate for differences between the desired and actual behaviors of the advertising campaign.

The reference signal is also used together with the estimated plant parameters to determine a feed forward signal representing a preemptive control action before a tracking error can occur (step 545). A cost-per-unit (CPU) of the campaign may also be used in computing the feed-forward control signal. The feedback signal and the feed-forward signal are integrated to determine a final control signal (step 550). In some embodiments, the final control signal may be limited within a desired interval using, for example, an anti-windup filter. Finally, the controller outputs the final control signal to adjust the performance of the advertising campaign relative to the desired behavior of the advertising campaign (step 555).

The final control signal may adjust the performance of the advertising campaign, for example, by causing the bid price of an advertisement in the campaign to appear lower or higher relative to other campaigns in order to accelerate or decelerate the expenditure of the campaign's advertising budget. In this way, the advertising campaign's revenue expenditure would be smoothed toward the desired behavior, such as spending money on ad placements only on weekends or spending money evenly over each day. In another example, the final control signal may reduce or increase the number of possible websites where the advertisement may be placed, or may limit the maximum number of impressions of the advertisement that may be placed. Many other adjustments may also be made in order to control the campaign's behavior consistent with the present invention.

Methods and systems consistent with the present invention enable the control of aspects of an advertising campaign, such as revenue expenditure, by comparing actual and desired behavior and incorporating feedback and feed-forward error correction to continuously adjust the campaign's behavior. In certain embodiments, this control is achieved without considering individual advertisement requests or ad placements, thus bypassing the lowest-level details and instead adjusting behavior on a campaign-wide level.

What is claimed is:

1. A method for controlling an advertising campaign, comprising:
   receiving, by a controller, input data related to a desired behavior of the advertising campaign;
   monitoring, by the controller, campaign data related to the advertising campaign, including a volume of impressions and a revenue generated during at least a part of the advertising campaign;
   evaluating, by the controller, an actual behavior of the advertising campaign-relative to the desired behavior, based on the monitored campaign data, to determine a feedback value;

generating, by the controller, a control value corresponding to the feedback value and at least one aspect of the advertising campaign; and outputting, by the controller, the control value to adjust the actual behavior of the advertising campaign.

2. The method of claim 1, wherein the determined feedback value is related to a tracking error in the actual behavior of the advertising campaign.

3. The method of claim 1, further including:
receiving, by the controller, an estimated parameter representing the at least one aspect of the advertising campaign; and
adjusting, by the controller, the generated control value to account for the at least one aspect of the advertising campaign.

4. The method of claim 3, wherein the at least one aspect of the advertising campaign includes at least one of an impression volume, a click volume, a conversion volume, an impression-to-click probability, an impression-to-conversion probability, and a click-to-conversion probability.

5. The method of claim 1, wherein the generated control value is used to adjust the volume of impressions placed during the advertising campaign.

6. The method of claim 1, wherein the generated control value is used to adjust the revenue generated during the advertising campaign.

7. The method of claim 1, wherein the generated control value is used to change a budget expenditure for the advertising campaign.

8. The method of claim 7, wherein the generated control value is used to change an apparent value of an advertisement in the advertising campaign to control the budget expenditure.

9. The method of claim 1, wherein the at least the part of the advertising campaign is a first time interval, and the outputted control value is used in a second time interval of the advertising campaign.

10. A method for controlling an advertising campaign, comprising:
receiving, by a controller, input data representing a desired behavior of the advertising campaign;
receiving, by the controller, an estimated parameter representing an aspect of the advertising campaign;
filtering, by the controller, the input data representing the desired behavior according to the estimated parameter;
monitoring, by the controller, an actual behavior of the advertising campaign;
calculating, by the controller, a predicted revenue of the advertising campaign based on the estimated parameter and the actual behavior of the advertising campaign;
comparing, by the controller, the filtered input data representing the desired behavior and the predicted revenue to identify a tracking error in the advertising campaign;
calculating, by the controller, a feedback value to correct the tracking error; and
generating, by the controller, a control value based on the feedback value to control the actual behavior of the advertising campaign relative to the desired behavior of the advertising campaign.

11. The method of claim 10, wherein calculating the feedback value further comprises:
adjusting, by the controller, the feedback value to account for an estimated gain associated with the advertising campaign.

12. The method of claim 10, further comprising:
determining, by the controller, a feed-forward value representing a preemptive control action based on the desired behavior and the estimated parameter, and wherein generating the control value further comprises:
integrating, by the controller, the feedback value and the feed-forward value.

13. The method of claim 10, wherein generating the control value further comprises:
filtering, by the controller, the control value to keep the control value within a predetermined range of acceptable values.

14. A method for controlling an advertising campaign based on a reference value that represents a desired behavior of the advertising campaign and an estimated parameter that represents an aspect of the advertising campaign, comprising:
filtering, by a controller, the reference value according to the estimated parameter using a pre-shape filter;
receiving, by the controller, monitoring data related to an actual behavior of the advertising campaign;
calculating, by the controller, a predicted revenue of the advertising campaign based on the monitoring data and the estimated parameter;
comparing, by the controller, the filtered reference value and the predicted revenue;
identifying, by the controller, a tracking error in the advertising campaign;
calculating, by the controller, a feedback value to correct the tracking error;
determining, by the controller, a feed-forward value that represents a preemptive control action based on the desired behavior and the estimated parameter; and
integrating, by the controller, the feedback value and the feed-forward value to generate a control value that adjusts the actual behavior of the advertising campaign relative to the desired behavior of the advertising campaign.

15. The method of claim 14, further including:
estimating, by the controller, a gain associated with the advertising campaign; and
adjusting, by the controller, the feedback value to account for the estimated gain.

16. The method of claim 14, further including:
filtering, by the controller, the control value to keep the control value within a predetermined range of acceptable values.

17. The method of claim 14, further including:
monitoring, by a sensor, data related to the actual behavior of the advertising campaign to ensure data reliability.

18. The method of claim 14, wherein the data related to the actual behavior is revenue data.

19. The method of claim 14, wherein the data related to the actual behavior is at least one of a volume of clicks, a volume of impressions, and a volume of actions.

20. The method of claim 14, further including:
changing, by the controller, the apparent value of an advertisement in the advertising campaign to control expenditure of a budget for the advertising campaign based on the generated control value.

21. A method for controlling an advertising campaign, comprising:
receiving, by a controller, input data related to a desired behavior of the advertising campaign;
monitoring, by the controller, actual campaign data related to the advertising campaign to determine an actual behavior of the advertising campaign, wherein aspects of the actual behavior include at least one of a budget expenditure during the advertising campaign, an apparent value of an advertisement in the advertising campaign, a revenue generated during the advertising campaign, volume of impressions placed during the advertising campaign, a bid price during the advertising campaign, and a bid allocation during the advertising campaign;

determining, by the controller, a feedback value based on the actual behavior of the advertising campaign relative to the desired behavior; and adjusting, by the controller, one or more of the aspects of the actual behavior of the advertising campaign based on the feedback value.

22. The method of claim 21, further including:

determining, by the controller, a tracking error of the advertising campaign; and wherein the adjusting includes adjusting, by the controller, one or more of the aspects of the actual behavior of the advertising campaign to match one or more aspects of the desired behavior of the advertising campaign based on the determined tracking error.

23. The method of claim 21, further including:

generating, by the controller, a control value based on the feedback value and at least one of the aspects of the advertising campaign; and wherein the adjusting includes adjusting, by the controller, one or more of the aspects of the actual behavior of the advertising campaign based on both the feedback value and the control value.

24. The method of claim 23, wherein the at least one aspect of the advertising campaign further includes at least one of a volume of impressions, a click volume, a conversion volume, an impression-to-click probability, an impression-to-conversion probability, and a click-to-conversion probability.

* * * * *